[22.]

O. H. Burdett. Steam Wagon.
No. 119,308.  Patented Sep. 26, 1871.

Witnesses:
John Beeker.
Wm. H. C. Smith.

Inventor:
O. H. Burdett.
Per 
Attorneys.

UNITED STATES PATENT OFFICE.

OLIVER H. BURDETT, OF NEW ATHENS, OHIO, ASSIGNOR TO HIMSELF AND ROBERT WEBB, OF SAME PLACE.

IMPROVEMENT IN STEAM-WAGONS.

Specification forming part of Letters Patent No. 119,308, dated September 26, 1871.

*To all whom it may concern:*

Be it known that I, OLIVER H. BURDETT, of New Athens, in the county of Harrison and State of Ohio, have invented a new and useful Improvement in Steam-Wagon; and I do hereby declare that the following is a full, clear, and exact description thereof, which will enable others skilled in the art to make and use the same, reference being had to the accompanying drawing forming part of this specification, in which—

Figure 1:
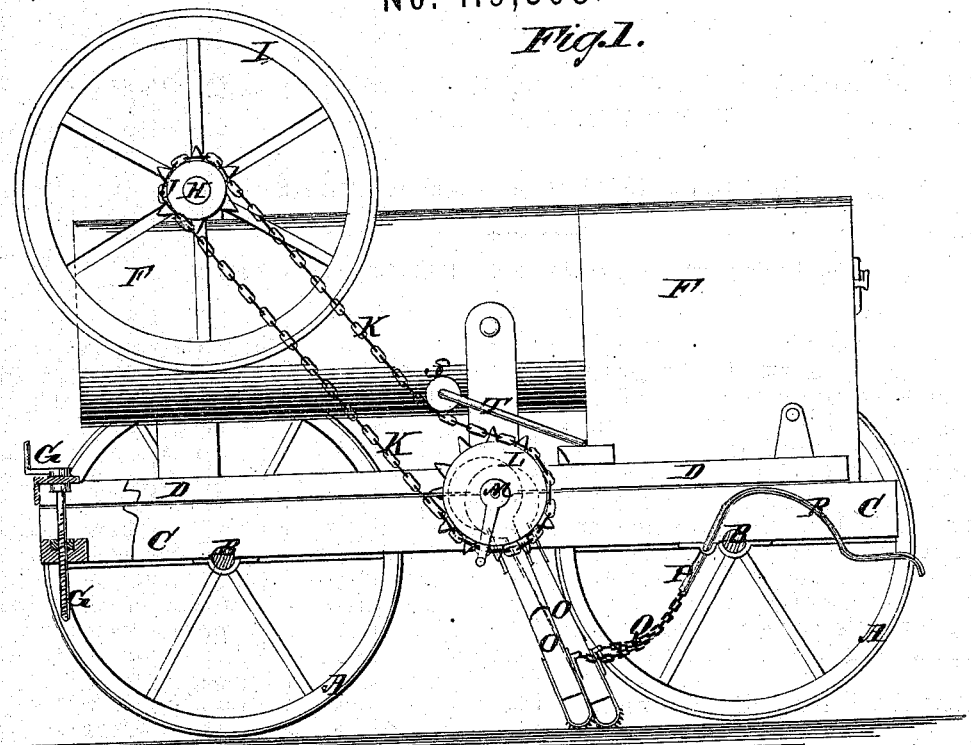
Figure 2:
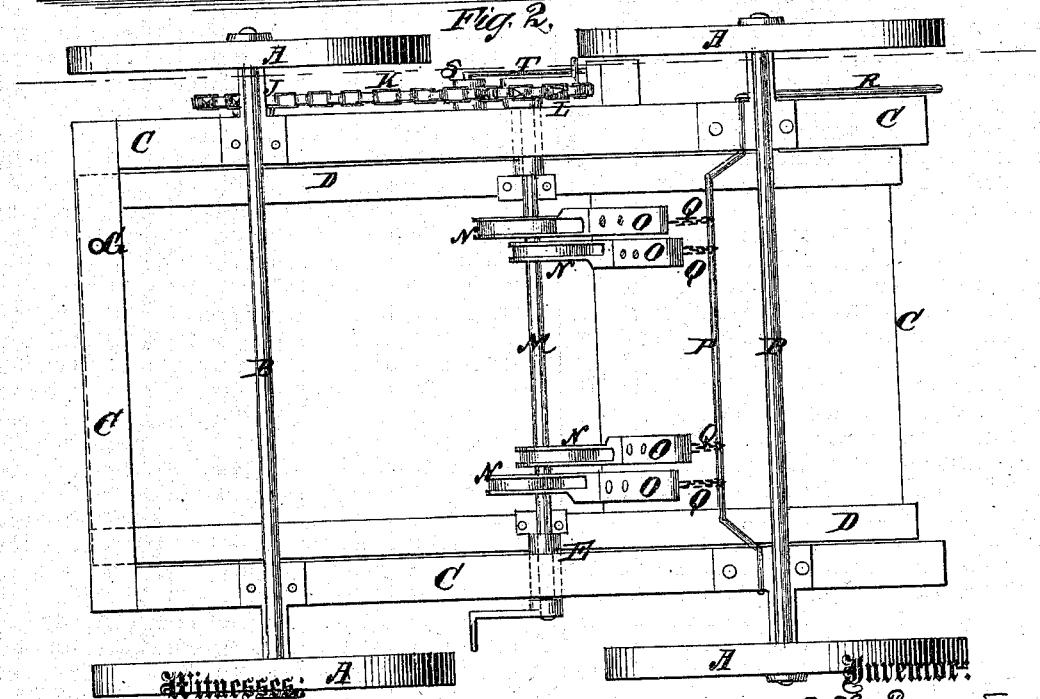
Figure 2:

Figure 1 is a side view of my improved steam-wagon, the near wheels being removed to show the construction. Fig. 2 is an under-side view of the same.

Similar letters of reference indicate corresponding parts.

My invention has for its object to furnish an improved steam-wagon for use upon ordinary roads for traction purposes, for drawing plows and other farm uses, and which may also be used as a stationary engine for driving saw-mills, thrashers, and other machinery; and it consists in the construction and combination of the various parts of the machine, as hereinafter more fully described.

A are the wheels, the axles B of which revolve in bearings attached to the frame C. The forward axle should be so arranged that the forward wheels may be turned by steering-wheels or other well-known means to guide the machine as desired. D is a frame placed within the frame C, and pivoted to it by means of gudgeons E, said gudgeons being attached to the middle parts of the side bars of the frame D, and working in bearings attached to the middle parts of the side bars of the frame C. To the frame D is attached the boiler F and the engine, about the construction of which there is nothing new. The one end of the frame D is connected with the corresponding end of the frame C by a swiveled crank-screw, G, or some other well-known device for accomplishing the same result, so that the pivoted frame D may be tilted toward either end to keep the boiler and engine level in going up and down hill or in working upon uneven land. H is the driving-shaft, to which power is communicated from the engine in the ordinary manner, and to which is attached a balance-wheel, I. The shaft H revolves in bearings in a frame-work attached to the frame D or boiler F or engine, so as to always have the same relative position with reference to said engine. To the shaft H, near the balance-wheel I, is attached a small spur-wheel, J. K is an endless chain, formed by connecting square links by means of flat metallic plates, said links being made of such a size as to exactly fit upon the spurs of the wheel J, and the connecting-plates being made of such a size as to fit into the spaces between the spurs of the said wheel J. L is a larger spur-wheel, around which the endless chain K also passes. The spur-wheel L is attached to the end of the shaft M, which passes through and works in the gudgeons E, which are made hollow to receive it, and which thus serve as bearings to the said shaft M. By this construction the shaft M will always be in the pivoting points of the frame D, so that no adjustment of the said frame D will affect the connection between the driving-shaft H and working shaft M. The spur-wheels J L and endless chain K may be replaced by bevel-gear wheels or by cranks and pitman, if desired. To the shaft M are attached four cams, N, placed two upon each side of the center of the shaft, and so arranged that two of them, one upon each side of the center of said shaft, may work together. To the cams N are connected, by straps, in the ordinary manner, the upper ends of the legs O, which are made of such a length that their lower ends may always rest upon the ground. The lower ends of the legs O are shod with iron, and are toothed, spiked, or roughened to enable them to take hold of and prevent them from slipping upon the ground. The legs O may be made in two parts, so that their lower parts may be detached to allow the legs to be swung to the front of the shaft M when it is desired to have the machine move backward. P is a shaft working in bearings attached to the rear part of the frame C, and which is bent twice at or nearly at right angles, near the inner sides of the frame C. The long crank thus formed is connected with the legs O, or with lugs or eyes attached to said legs, by chains Q, as shown in Fig. 2. To one or both ends of the crank-shaft P is attached a lever, R, so that by operating the said lever R the said legs O may be raised from the ground and held away as long as may be desired. This enables the engine to work without moving the machine forward, as, for instance, for pumping a supply of water into the tank, or for driving any stationary machinery. The cams N may be replaced by double cranks, if desired, and to the ends of the shaft M, upon the outside of the frame C, may be attached cams or cranks N, provided with legs in the same manner as the cams or cranks attached to the body of said shaft. S is a friction-roller pivoted to the elastic holder T, which is attached to the frame C in such a position as to hold the roller S down upon the chain K and not only keep it taut, but also keep it in position for passing upon the spur-wheels.

If desired, the legs connected with the end cams or cranks N may be made long, and may be connected with said cams or cranks by connecting-rods.

Other shafts similar to the shaft M, and provided with cams or cranks N and legs O in the same manner, may be attached to the frame C and geared with the said shaft M, so that in passing over rough or uneven ground one or more sets of legs may always be in position to operate effectively upon the ground.

Having thus described my invention, I claim as new and desire to secure by Letters Patent—

1. The combination of the inner pivoted frame D, to which the boiler, &c., are attached and swiveled, crank-screw G with the outer frame C, with which the wheels A are connected, substantially as herein shown and described, and for the purpose set forth.

2. The arrangement, in a steam-wagon, of the cam, crank, or working shaft M at the points at which the inner frame D that supports the boiler, &c., is pivoted to the frame C of the carriage, substantially as herein shown and described, and for the purpose set forth.

3. The combination of the shaft H, to which power is applied from the engine, spur-wheels J L, and endless chain K, or equivalent gearing, shaft M working at the pivoting-points of the frame D, cams or cranks N, legs O, swiveled crank-screw G, frame D and C, and wheels A with each other, substantially as herein shown and described, and for the purposes set forth.

OLIVER H. BURDETT.

Witnesses:
JAMES O. HENDERSON,
JACOB W. WEBB.